United States Patent Office.

JOHN McMURTRY, OF MT. STERLING, KENTUCKY.

Letters Patent No. 104,619, dated June 21, 1870.

IMPROVEMENT IN HARDENING MAGNESIAN LIMESTONE.

The Schedule referred to in these Letters Patent and making part of the same

*To all whom it may concern:*

Be it known that I, JOHN McMURTRY, of Mt. Sterling, in the county of Fayette and State of Kentucky, have invented certain new and useful Improvements in the Production of New Articles of Manufacture from Magnesian Limestone; and I do hereby declare that the following is a full, clear, and exact description thereof.

The nature of my invention consists in production of new articles of manufacture from magnesian limestone, in the manner hereinafter set forth.

In order to enable others skilled in the art to which my invention appertains to make and use the same, I will now proceed to describe the manner in which the same is or may be produced.

Articles, such as mantles, vases, fountains, urns, statuary, or others of similar nature, have heretofore most generally been made of hard stone or marble, at considerable expense. By continued experiments I have found that the so-called magnesian limestone may be used for this and kindred purposes, by merely subjecting it to the necessary degree of heat.

From this stone the articles are first formed in the desired shape, and then, by any of the known and usual processes, they are stained or marbled to suit the taste. The articles are now subjected to heat, in a furnace or otherwise, and the heat raised to any desired degree, when a beautiful stained or marbled appearance is imparted to the articles, and they are, at the same time, brought by the heat to the required hardness.

Magnesian limestone may, by preparing the same in the manner above set forth, be used for a variety of purposes, and the articles produced cost considerably less than similar articles made in the usual manner of hard stone.

Having thus fully described my invention,

What I claim as new, and desire to secure by Letters Patent, is—

1. The within-described process of preparing magnesian limestone, substantially for the purposes herein set forth.

2. As a new article of manufacture, magnesian limestone prepared substantially in the manner and for the purposes herein set forth.

JOHN McMURTRY.

Witnesses:
    JAMES TURLEY,
    L. DEBARD.